(12) United States Patent
Lee et al.

(10) Patent No.: US 8,406,309 B2
(45) Date of Patent: Mar. 26, 2013

(54) VIDEO RATE ADAPTATION TO REVERSE LINK CONDITIONS

(75) Inventors: Yen-Chi Lee, San Diego, CA (US); Christopher Gerard Lott, San Diego, CA (US); Peerapol Tinnakornsrisuphap, San Diego, CA (US); Vikram Gupta, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1603 days.

(21) Appl. No.: 11/445,099

(22) Filed: May 31, 2006

(65) Prior Publication Data

US 2009/0034610 A1 Feb. 5, 2009

Related U.S. Application Data

(63) Continuation-in-part of application No. 11/314,428, filed on Dec. 20, 2005.

(60) Provisional application No. 60/797,260, filed on May 2, 2006, provisional application No. 60/731,614, filed on Oct. 27, 2005, provisional application No. 60/729,017, filed on Oct. 21, 2005.

(51) Int. Cl.
*H04N 7/18* (2006.01)

(52) U.S. Cl. .............................. 375/240.26; 375/240.28

(58) Field of Classification Search . 375/240.01–240.29
See application file for complete search history.

(56) References Cited

U.S. PATENT DOCUMENTS

| | | | |
|---|---|---|---|
| 4,774,587 A | 9/1988 | Schmitt | |
| 5,341,374 A | 8/1994 | Lewen et al. | |
| 5,367,523 A | 11/1994 | Chang et al. | |
| 5,541,919 A | 7/1996 | Yong et al. | |
| 5,550,589 A | 8/1996 | Shiojiri et al. | |
| 5,550,593 A | 8/1996 | Nakabayashi | |
| 5,621,840 A | 4/1997 | Kawamura et al. | |
| 5,768,533 A | 6/1998 | Ran | |
| 5,790,538 A | 8/1998 | Sugar | |
| 5,802,068 A | 9/1998 | Kudo | |
| 5,838,678 A | 11/1998 | Davis et al. | |
| 5,969,764 A | 10/1999 | Sun et al. | |
| 6,002,802 A | 12/1999 | Chujoh et al. | |
| 6,111,917 A | 8/2000 | Tomita et al. | |
| 6,154,489 A | 11/2000 | Kleider et al. | |
| 6,233,251 B1 | 5/2001 | Kurobe et al. | |
| 6,330,683 B1 | 12/2001 | Jeddeloh | |
| 6,389,034 B1 | 5/2002 | Guo et al. | |
| 6,396,956 B1 | 5/2002 | Ribas-Corbera et al. | |

(Continued)

FOREIGN PATENT DOCUMENTS

| CN | 1272271 | 11/2000 |
|---|---|---|
| CN | 1273011 | 11/2000 |

(Continued)

OTHER PUBLICATIONS

Fidler M, "Real-Time Multimedia Streams in a Differentiated Services Network," Computer Communications and Networks, 2001. Proceedings Tenth International Conference on Oct. 15-17, 2001, Piscataway, NJ, USA, IEEE, pp. 380-385, XP010562121.

(Continued)

*Primary Examiner* — Andy Rao
(74) *Attorney, Agent, or Firm* — John Rickenbrode

(57) ABSTRACT

The disclosure relates to video rate adaptation techniques that may use information from a medium access control (MAC) layer and radio link protocol (RLP) layer. The techniques may greatly reduce video delay by adjusting video encoding rate. For real-time video telephony (VT) applications, these techniques may provide graceful quality degradation and improve user experience, especially when the channel conditions degrade.

33 Claims, 8 Drawing Sheets

U.S. PATENT DOCUMENTS

| | | |
|---|---|---|
| 6,404,776 B1 | 6/2002 | Voois et al. |
| 6,421,387 B1 | 7/2002 | Rhee |
| 6,487,316 B1 | 11/2002 | Fukunaga et al. |
| 6,490,243 B1 | 12/2002 | Tanaka et al. |
| 6,574,247 B1 | 6/2003 | Baggen et al. |
| 6,587,437 B1 | 7/2003 | Lee et al. |
| 6,629,318 B1 | 9/2003 | Radha et al. |
| 6,633,609 B1 | 10/2003 | Ing et al. |
| 6,747,991 B1 | 6/2004 | Hemy et al. |
| 6,862,298 B1 | 3/2005 | Smith et al. |
| 6,865,374 B2 | 3/2005 | Kalluri |
| 6,891,822 B1 | 5/2005 | Gubbi et al. |
| 7,023,915 B2 | 4/2006 | Pian et al. |
| 7,051,358 B2 | 5/2006 | Hakenberg et al. |
| 7,058,085 B2 | 6/2006 | Earnshaw et al. |
| 7,068,086 B2 | 6/2006 | Takeda |
| 7,193,966 B2 | 3/2007 | Gupta et al. |
| 7,197,026 B2 * | 3/2007 | Chen et al. .............. 370/342 |
| 7,206,285 B2 | 4/2007 | Loguinov |
| 7,269,139 B1 | 9/2007 | Williams, Jr. et al. |
| 7,304,951 B2 | 12/2007 | Rhee |
| 7,342,880 B2 | 3/2008 | Yanagihara et al. |
| 7,342,901 B1 * | 3/2008 | Zhang et al. .............. 370/329 |
| 7,356,079 B2 | 4/2008 | Laksono et al. |
| 7,369,497 B2 | 5/2008 | Naruse |
| 7,369,517 B2 | 5/2008 | Dillinger et al. |
| 7,433,408 B2 | 10/2008 | Hatano et al. |
| 7,453,938 B2 | 11/2008 | Haskell et al. |
| 7,492,710 B2 | 2/2009 | Wadekar et al. |
| 7,533,192 B2 | 5/2009 | Otsuka et al. |
| 7,606,427 B2 | 10/2009 | Malayath et al. |
| 7,840,412 B2 | 11/2010 | Aprea et al. |
| 8,102,878 B2 | 1/2012 | Lee |
| 2002/0007416 A1 | 1/2002 | Putzolu |
| 2002/0031336 A1 | 3/2002 | Okada et al. |
| 2002/0054578 A1 | 5/2002 | Zhang et al. |
| 2002/0154640 A1 | 10/2002 | Wei |
| 2002/0191544 A1 | 12/2002 | Cheng et al. |
| 2002/0191722 A1 | 12/2002 | Naruse |
| 2003/0012212 A1 | 1/2003 | Earnshaw et al. |
| 2003/0026277 A1 | 2/2003 | Pate et al. |
| 2003/0054769 A1 | 3/2003 | Kalluri |
| 2003/0095594 A1 | 5/2003 | Laksono et al. |
| 2003/0152032 A1 | 8/2003 | Yanagihara et al. |
| 2004/0076118 A1 | 4/2004 | Ho et al. |
| 2004/0240558 A1 | 12/2004 | Hatano et al. |
| 2004/0252761 A1 | 12/2004 | Brown et al. |
| 2005/0013244 A1 | 1/2005 | Parlos |
| 2005/0013245 A1 | 1/2005 | Sreemanthula et al. |
| 2005/0117056 A1 | 6/2005 | Aprea et al. |
| 2005/0175093 A1 | 8/2005 | Haskell et al. |
| 2005/0207392 A1 | 9/2005 | Sivalingham et al. |
| 2005/0210515 A1 | 9/2005 | Roh et al. |
| 2005/0220116 A1 | 10/2005 | Ahn et al. |
| 2005/0243846 A1 | 11/2005 | Mallila |
| 2005/0249231 A1 | 11/2005 | Khan |
| 2005/0259694 A1 | 11/2005 | Garudadri et al. |
| 2005/0283809 A1 | 12/2005 | Kim |
| 2006/0007958 A1 | 1/2006 | Kang et al. |
| 2006/0013263 A1 | 1/2006 | Fellman |
| 2006/0050743 A1 | 3/2006 | Black et al. |
| 2006/0072832 A1 | 4/2006 | Nemiroff et al. |
| 2006/0083243 A1 | 4/2006 | Igarashi et al. |
| 2006/0256756 A1 | 11/2006 | Wakabayashi |
| 2007/0019931 A1 | 1/2007 | Sirbu |
| 2007/0071030 A1 | 3/2007 | Lee |
| 2007/0091815 A1 | 4/2007 | Tinnakornsrisuphap |
| 2007/0091816 A1 | 4/2007 | Lee et al. |
| 2007/0097257 A1 | 5/2007 | El-Maleh et al. |
| 2007/0121706 A1 | 5/2007 | Nakamura et al. |
| 2007/0201406 A1 | 8/2007 | Yoon et al. |
| 2007/0291870 A1 | 12/2007 | Ponnekanti |
| 2008/0056125 A1 | 3/2008 | Kneckt et al. |
| 2008/0170500 A1 | 7/2008 | Ito et al. |
| 2008/0205856 A1 | 8/2008 | Kim et al. |
| 2009/0021572 A1 | 1/2009 | Garudadri et al. |
| 2009/0034610 A1 | 2/2009 | Lee et al. |
| 2009/0046743 A1 | 2/2009 | Hamanaka |
| 2009/0180379 A1 | 7/2009 | Leung et al. |
| 2010/0215053 A1 | 8/2010 | Chakareski et al. |

FOREIGN PATENT DOCUMENTS

| | | |
|---|---|---|
| CN | 1293871 | 5/2001 |
| CN | 1674676 A | 9/2005 |
| DE | 1170957 | 1/2009 |
| EP | 1014739 | 6/2000 |
| EP | 1168732 | 1/2002 |
| EP | 1170957 | 1/2002 |
| EP | 1261163 | 11/2002 |
| EP | 1372304 | 12/2003 |
| EP | 1478137 | 11/2004 |
| EP | 1482681 | 12/2004 |
| EP | 1575225 | 9/2005 |
| EP | 1628446 A1 | 2/2006 |
| EP | 1641147 | 3/2009 |
| JP | 9130787 | 5/1997 |
| JP | 9214507 A | 8/1997 |
| JP | 10164533 A | 6/1998 |
| JP | 10303932 A | 11/1998 |
| JP | 10322673 A | 12/1998 |
| JP | 10341217 A | 12/1998 |
| JP | 11069349 A | 3/1999 |
| JP | 2000324171 A | 11/2000 |
| JP | 2001230809 | 8/2001 |
| JP | 2001238256 A | 8/2001 |
| JP | 2001517049 | 10/2001 |
| JP | 2002016929 A | 1/2002 |
| JP | 2002354141 A | 12/2002 |
| JP | 2003209537 A | 7/2003 |
| JP | 2003244695 | 8/2003 |
| JP | 2004015761 A | 1/2004 |
| JP | 2004072720 A | 3/2004 |
| JP | 2004208001 A | 7/2004 |
| JP | 2004253883 | 9/2004 |
| JP | 2004350227 A | 12/2004 |
| JP | 2004364277 A | 12/2004 |
| JP | 2004537203 A | 12/2004 |
| JP | 2005057323 A | 3/2005 |
| JP | 2005192073 A | 7/2005 |
| JP | 2005236783 A | 9/2005 |
| JP | 2005286832 A | 10/2005 |
| JP | 2005303925 A | 10/2005 |
| JP | 2006222822 A | 8/2006 |
| KR | 20020081521 A | 10/2002 |
| KR | 1020060046281 | 5/2006 |
| RU | 2161873 C2 | 1/2001 |
| RU | 2219671 | 12/2003 |
| RU | 2219682 C2 | 12/2003 |
| RU | 2002130511 | 3/2004 |
| RU | 2295833 C2 | 3/2007 |
| WO | WO9823109 A2 | 5/1998 |
| WO | WO9914975 | 3/1999 |
| WO | 0018130 | 3/2000 |
| WO | WO0180477 | 10/2001 |
| WO | WO03001725 A1 | 1/2003 |
| WO | WO03026316 | 3/2003 |
| WO | WO03077462 A1 | 9/2003 |
| WO | 2004560288 | 7/2004 |
| WO | WO2004056123 | 7/2004 |
| WO | 2004084503 | 9/2004 |
| WO | WO2004091130 A1 | 10/2004 |
| WO | WO2005004374 A2 | 1/2005 |
| WO | WO2005039209 A1 | 4/2005 |
| WO | WO2005122025 A2 | 12/2005 |
| WO | 2007051156 | 5/2007 |
| WO | WO2007119086 | 10/2007 |
| WO | WO2008024890 A2 | 2/2008 |

OTHER PUBLICATIONS

Kamel I et al.: "A Study on Scheduling Multiple Priority Requests in Multimedia Servers," Multimedia Computing and Systems, 1999. IEEE International Conference on Florance, Italy Jun. 7-11, 1999, Los Alamitos, CA, USA, IEEE comput. Soc., US, vol. 2, pp. 395-399, XP010519422.

Keller R et al.: "An Active Router Architecture for Multicast Video Distribution," Infocom 2000. Nineteenth Annual joint Conference of the IEEE Computer and Communications Societies . Proceedings IEEE Tel Aviv, Israel, Mar. 26-30, 2000, Piscataway, NJ, USA. pp 1137-1146.
Lakshman T et al.: "The Drop from Front Strategy in TCP and in TCP over ATM," Proceedings of IEEE Infocom 1996. Conference on Computer Communications, Fifteenth Annual Joint Conference of the IEEE Computer and Communications Societies. Networking the Next Generation, Mar. 24-28, 1996, vol. 3, conf. 15, pp. 1242-1250, XP000622260.
Meng-Huang Lee et al.: "A Predictable High-Throughput File System for Video Conference Recording," Systems, Man and Cybernetics, 1995. Intelligent Sytmes for the 21st Century, IEEE International Conference on Vancouver, BC, Canada Oct. 22-25, 1995, New York, vol. 5, pp. 4296-4301, XP010195015.
Myeong-Jin Lee et ai.: "Video Frame Rate Control for Non-Guaranteed Network Services with Expiicit Rate Feedback," Proceedings of Global Telecommunications Conference, pp. 293-297, 2000, XP002427648.
Reininger D et al.: "VBR MPEG Video Coding with ynamic Bandwidth Renegotiation," Communications-Gateway to Globalization. Proceedings of the Conference on Communications. Seattle, Jun. 18-22, 1995, ICC, New York, IEEE, US, vol. 3, pp. 1773-1777.
Zhihai HE et al.: "A Linear Source Model and a Unified Rate Control Algorithm for DCT Video Coding," IEEE Transactions on Circuits and Systems for Video Technology, IEEE Service Center, Piscataway, NJ, US, vol. 12, No. 11, Nov. 2002, pp. 970-982, XP011011890.
Zhihai HE et al.: "Optimum Bit Allocation and Accurate Rate Control for Video Coding via rho-Domain Source Modeling" IEEE Transactions on Circuits and Systems for Video TechnoIogy, IEEE Service Center, Piscataway, NJ, US, vol. 12, No. 10, Oct. 2002, pp. 840-849, XP011071878.
3GPP2 C.S0024-A:" cdma2000 High rate Packet Data Air Interface Specification," version 1.0, p. 11-143, Mar. 2004.
ITU-T H.263 "Series: H Audiovisual and Multimedia Systems Infrastructure of Audiovisual services—Coding of Moving video—Video Coding for Low Bit Rate Communication," (Jan. 2005).
RFC 2190 C. Zhu et al.: "RTP Payload Format for H.263 Video Streams," Network Working Group, pp. 1-12, Sep. 1997.
RFC 2429 C. Borman et al.: "RTP Payload Format for the 1998 Version of ITU-T Rec. H.263 Video (H.263+)," Network Working Group, pp. 1-17, Oct. 1998.
RFC 3016 Y. Kikuchi et al,: "RTP Payload Format for MPEG-4 Audio/Visual Streams," Network Working Group, pp. 1-21, Nov. 2000.
International Search Report—PCT/US07/070006—International Search Authority—European Patent Office, Jan. 3, 2008.
Written Opinion—PCT/US07/070006—International Search Authority—European Patent Office, Jan. 3, 2008.
Hosein P et al: "Dynamic power headroom threshold for mobile rate determination in a CDMA network", Vehicular Technology Conference, 2004. VTC 2004—Spring. 2004 IEEE 59th Milan, Italy May 17-19, 2004, Piscataway, NJ, USA, IEEE, US, pp. 2404-2408, XP010766590, ISBN: 0-7803-8255-2.
Kalavakunta R et al: "Evolution of mobile broadband access technologies and services considerations and solutions for smooth migration from 2G to 3G networks", Personal Wireless Communications, 2005. ICPWC 2005. 2005 IEEE. International Conference on New Delhi, India Jan. 23-25, 2005, Piscataway, NJ, USA, IEEE, pp. 144-149, XP010799046, ISBN: 0-7803-8964-6.
"Video-Codec Test Model, Near-Term, Version 8 (TMN8) Revision 1" ITU-T Telecommunication Standarization Sector of ITU, Geneva, CH, vol. Q15/16, Sep. 8, 1997, pp. I-III, 1, XP001074663.
Text Description of Joint Model Reference Encoding Methods and Decoding Concealment Methods, Joint Video Team (JVT) of ISO/IEC MPEG and ITU-T VCEG Hong Kong, Jan. 2005. Sections 2.1.2.1.2, 2.1.3.1.1, 2.5, 3.1, 3.3.
"TIA/EIA/IS-856 CDMA2000 High Rate Packet Data Air Interface Specification," Apr. 2004.

3GPP TR 26.902 V1.0.0, "3RD Generation Partnership Project; Technical Specification Group Services and System Aspects; Video Codec Performance," (Release 7)(Mar. 2007).
3GPP TR 26.914, "Multimedia telephony over IP Multimedia Subsystem (IMS); Optimization opportunities" 2006.
3GPP TS 26.114 v1.2.0 (Dec. 13, 2006), "3rd Generation Partnership Project; Technical Specification Group Services and System Aspects—IP multimedia subsystem (IMS) multimedia telephony; media handling and interaction," (Release 7) TSG-SA4 internal working draft.
3GPP TS 34.108 v6.5.0, "3rd Generation Partnership Project; Technical Specification Group Radio Access Network Common test environment for UE conformance testing," (Release 6) (Dec. 2006).
3GPP2 C.R1008 v1.0, "cdma2000 Multimedia evaluation methodologies," Jan. 12, 2007.
3GPP2: "Packet Switched Video Telephony Services (PSVT/MCS)" 3GPP2, C.S0055-0, Version 1.0, Dec. 2007, XP002542622 p. 32, paragraph 8-p. 33.
D. Morikawa et al.: A feedback rate control of video stream in best-effort high-speed mobile packet network, The 5th Int. Symp. Wireless Personal Multimedia Comm., Oct. 27-30, 2002.
D. Singer et al., "A general mechanism for RTP Header Extensions," RFC 5285, IETF Internet Draft (Jul. 2008).
G.Cheung et al., "Video transport over wireless networks," IEEE Trans . Multimedia, Aug. 2005 , pp. 777-785.
H. Schulzrinne et al.,"RTP: A Transport Protocol for Real-Time Applications," IETF RFC 3550 (2003).
Hari Garudadri et al.: "Feedback Based Network Adaptive Source Coding for Packet Switched Multimedia Telephony," Qualcomm Inc.—PSVT: Feedback base rate control; version 0.6 May 26, Sep. 13, Sep. 19, 2006, pp. 1-9.
Harinath Garudadri et al.: "Rate Adaptation for Video Telephony in 3G Networks" Nov. 12-13, 2007, pp. 342-348.
I. Johansson et al., "Support for non-compound RTCP in RTCP AVPF profile, opportunities and consequences," IETF Internet Draft Dec. 20, 2006; Expires Jun. 23, 2007.
ISO/IEC 14496-2, International Standard, Information technology—Coding of audio-visual objects—Part 2: Visual, Third edition Jun. 1, 2004.
ITU-T H.264, Series H: Audiovisual and Multimedia System Infrastructure of audiovisual services, Coding of moving video, "Advanced video coding for generic audivisual services," Nov. 2007: 7.3.5.3 Residual Data Syntax; and 9.2 CALVLC parsing process.
"ITU-T Study Group 16, rate control for low-delay video communications," No. q15-A-20, 1997.
Kang, K. et al.: "Dynamic Rate Control Mechanism for Large Scale Sessions," Twelfth International Conference on Information Networking Proceedings, 1998. (ICOIN-12). Tokyo, Japan, Jan. 21-23, 1998, pp. 21-24, XP010265270, ISBN: 978-0-8186-7225-5., doi: 10.1109/ICOIN.1998.648346.
Khansari, M. et al.: "Low Bit-Rate Video Transmission over Fading Channels for Wireless Microcellular Systems," IEEE Transactions on Circuits and Systems for Video Technology, IEEE Service Center, Piscataway, NJ, US, vol. 6, No. 1, (Jan. 2, 1996), XP011014283, ISSN: 1051-8215.
Kueh V Y H et al.: "Performance evaluation of SIP-based session establishment over satellite-UMTS" VTC 2003—Spring. The 57th IEEE Semiannual Vehicular Technology Conference Proceedings. Apr. 22-25, 2003, vol. 2, pp. 1381-1385, XP010862.
Lei Z et al.: "Adaptive video transcoding and streaming over wireless channels" Journal of Systems & Software, vol. 75, No. 3, Mar. 1, 2005, pp. 253-270, XP004656968.
Lu, X; et. al: "Understanding video quality and its use in feedback control" Packet Video 2002, Pittsburgh,PA USA 2002.
Ott Helsinki University of Technology S Wenger Nokia N Sato Oki C Burmeister J Rey Matsushita J: "Extended RTP Profile for Real-time Transport Control Protocol (RTCP)-Based Feedback (RTP/AVPF); rfc4585.txt" IETF Standard, Internet Engineering Task Force, IETF, CH, Jul. 1, 2006, XP015055018 ISSN: 0000-0003 abstract p. 31, paragraph 6-p. 41.
Ruiz, P. et el.: "Adaptive Multimedia Applications to Improve User-perceived QoS in Multihop Wireless Ad hoc Networks," Proceedings of the IEEE International Conference on Wireless Lane and Horne Networks (1CWLHN 2002) Online] Aug. 2002, pp. 673-684, XP002466712.

Stockhammer, Thomas. "Progressive Video Transmission for Packet Lossy Channels Exploiting Feedback and Unequal Reasure Protection," International Conference on Image Processing (ICIP), vol. 2, (Sep. 22, 2009), pp. 169-172, XP010607935, ISBN: 978-0-7803-7622-9.

Technical Specification Group Radio Access Network: "3GPP TR25. 848 V4.0.0 Physical Layer Aspects of UTRA High Speed Downlink Packet Access (Release 4)" 3GPP TR 25.848 V4.0.0, Mar. 2001, pp. 1-89, XP002189517.

Translation of Korean Application 2008-7029470 corresponding to U.S. Appl. No. 11/445,099, citing KR2005-45667 (KR pub KR20060046281) dated Apr. 30, 2010.

Translation of Office Action in Chinese application 200680046647.1 corresponding to U.S. Appl. No. 11/454,475, citing US20030122212 and CN1293871 dated Mar. 17, 2011.

Translation of Office Action in Chinese Application 200680046657.5 corresponding to U.S. Appl. No. 11/315,399, citing US20030152032, CN1272271, WO2004056028, EP1170957 and EP1168732 dated Mar. 16, 2011.

Translation of Office Action in Japan application 2008-533677 corresponding to U.S. Appl. No. 11/240,133, citing JP10164533, JP10322673, JP2004072720, JP2004364277, JP2005236783, JP2004350227, US5541919 and US5341374 dated Feb. 1, 2011.

T.V. Lakshman et al.: "Transporting compressed video over ATM networks with explicit-rate feedback control," IEEE Trans. Networking, Oct. 1999, vol. 7, No. 5, pp. 710-723.

T.V. Lakshman et al.: "VBR Video: Tradeoffs and Potentials", Proceeding of the IEEE, May 1998, vol. 86, No. 5, pp. 952-973.

"Universal Mobile Telecommunications System (UMTS); Radio Link Control (RLC) Protocol Specification (3GPP TS 25.322 version 6.9.0 Release 6); ETSI TS 125.322" ETSI Standards, LIS, vol. 3-R2, No. v6.9.0, Sep. 1, 2006, XP014035577.

Y.-G. Kim et al.: "TCP-frendly internet video with smooth and fast rate adaption and networks-aware error control," IEEE Trans. Circ. Sys. Vid. Tech., Feb. 2004, vol. 14, No. 2, pp. 256-268.

3GPP S4-060613 "MTSI Dynamic Video Rate Adaptation", Nov. 2006, pp. 1-6.

3GPP TS 26.234 v7.1.0 (Dec. 2006), 3rd Generation Partnership Project; Technical Specification Group Services and System Aspects; Transparent end-to-end Packet-switched Streaming Service (PSS); Protocols and codecs (Release 7) pp. 35-39, 41-42, and 49-52.

Simulation Results for MTSI Dynamic Video Adaptation Signalling, 3GPP TSG-SA WG4 #42 S4-070056, Jan. 29, 2007, pp. 1-12.

\* cited by examiner

| Conditions | Network Load (RA distribution) | Fast Fading | Slow Fading | Soft Hand-Off |
|---|---|---|---|---|
| 1 | Light Load (5%) | No | No | No |
| 2 | Light Load (5%) | ChA (3kmph) | ChA TVshadow (3kmph) | Yes |
| 3 | Light Load (5%) | ChA (3kmph) | ChB TVshadow (10kmph) | No |
| 4 | Light Load (5%) | ChA (3kmph) | ChB TVshadow (10kmph) | Yes |
| 5 | Light Load (5%) | ChA (3kmph) | ChD TVshadow (120kmph) | No |
| 6 | Light Load (5%) | ChA (3kmph) | ChD TVshadow (120kmph) | Yes |

FIG. 2A

| | EV-DO Revision A (RL only) | | | | | | | | | |
|---|---|---|---|---|---|---|---|---|---|---|
| Profiles | Audio Delay | | | | | Video Delay | | | | |
| Conditions | Mean | Std | Max | Min | 98% | Mean | Std | Max | Min | 95% |
| 1 | 44.85 | 19.08 | 148 | 18 | 91 | 94 | 26 | 335 | 31 | 137 |
| 2 | 48.89 | 23.68 | 192 | 18 | 110 | 814 | 1359 | 5718 | 33 | 4122 |
| 3 | 54.83 | 34.00 | 271 | 18 | 159 | 1976 | 3860 | 15390 | 32 | 12520 |
| 4 | 52.44 | 28.27 | 238 | 18 | 136 | 1714 | 3255 | 13398 | 34 | 10951 |
| 5 | 55.97 | 31.53 | 271 | 18 | 144 | 561 | 881 | 5142 | 32 | 2614 |
| 6 | 48.90 | 24.85 | 222 | 17 | 115 | 208 | 324 | 2447 | 29 | 851 |

FIG. 2B

FIG. 5B  Example 1: RLP queue size becomes zero at time $t_n$
Video encoder encodes frame $n-1$ of size $B_{n-1}= 500$
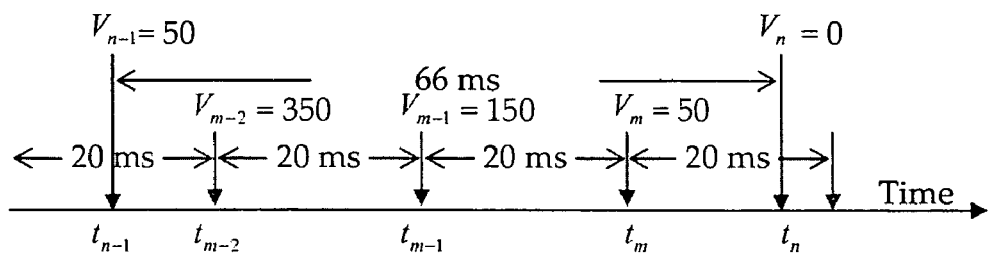
FIG. 5C  Example 2: RLP queue size becomes zero at time $t_m$
Video encoder encodes frame $n-1$ of size $B_{n-1}= 500$
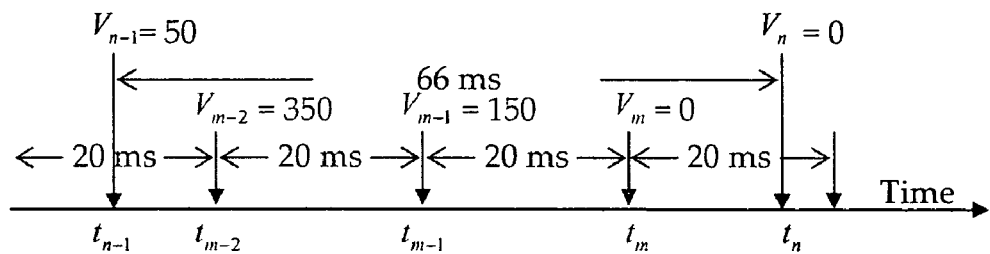

FIG. 5D  Example 3: RLP queue size becomes zero at time $t_{m-1}$
Video encoder encodes frame $n-1$ of size $B_{n-1} = 500$
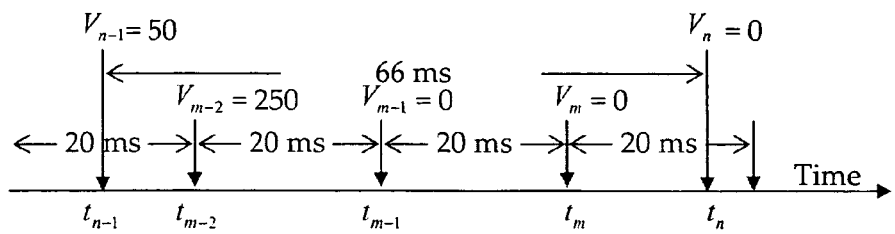
FIG. 5E  Example 4: RLP queue size becomes zero at time $t_{m-2}$
Video encoder encodes frame $n-1$ of size $B_{n-1} = 500$
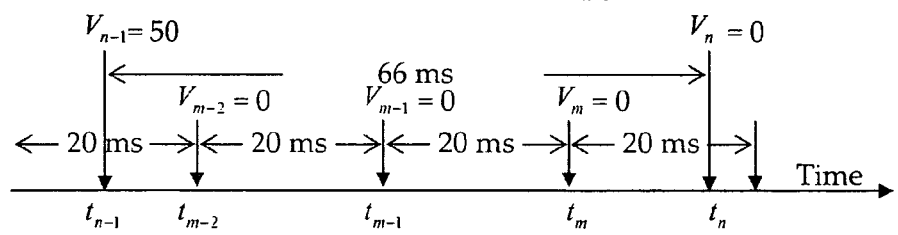

| TxT2PHiCap PreTransition (db) | Payload Size (bits) | Effective Data Rate (kbps) | | | |
|---|---|---|---|---|---|
| | | After 4 slots Delay: 6.66ms | After 8 slots Delay: 26.66ms | After 12 slots Delay: 46.66ms | After 16 slots Delay: 66.66ms |
| 3.25 | 128 (16) | 19.2 | 9.6 | 6.4 | 4.8 |
| 6.50 | 256 (32) | 38.4 | 19.2 | 12.8 | 9.6 |
| 9.50 | 512 (64) | 76.8 | 38.4 | 25.6 | 19.2 |
| 11.50 | 768 (96) | 115.2 | 57.6 | 38.4 | 28.8 |
| 12.50 | 1024 (128) | 153.6 | 76.8 | 51.2 | 38.4 |
| 14.00 | 1536 (192) | 230.4 | 115.2 | 76.8 | 57.6 |
| 15.50 | 2048 | 307.2 | 153.6 | 102.4 | 76.8 |
| 16.25 | 3072 | 460.8 | 230.4 | 153.6 | 115.2 |
| 17.50 | 4096 | 614.4 | 307.2 | 204.8 | 153.6 |
| 19.00 | 6144 | 921.6 | 460.4 | 307.2 | 230.4 |
| 20.25 | 8192 | 1228.8 | 614.4 | 409.6 | 307.2 |
| 23.75 | 12288 | 1843.2 | 921.6 | 614.4 | 460.8 |

Payload Size (bits)

| | TT=12 | TT=16 | (TT means termination target) |
|---|---|---|---|
| 128 | 3.25 dB | 0.75 | |
| 256 | 6.5 | 3.75 | |
| 512 | 9.5 | 7.0 | |
| 768 | 11.5 | 8.75 | |
| 1024 | 12.5 | 10.0 | |
| 1536 | 14.0 | 11.5 | |
| 2048 | 15.5 | 13.0 | |
| 3072 | 16.25 | 14.25 | |
| 4096 | 17.5 | 15.5 | |
| 6144 | 19.0 | 17.0 | |
| 8192 | 20.25 | 18.5 | |
| 12288 | 23.75 | 21.25 | |

VIDEO RATE ADAPTATION TO REVERSE LINK CONDITIONS

CLAIM OF PRIORITY

This application is a continuation-in-part application and claims priority to co-assigned U.S. patent application Ser. No. 11/314,428, filed on Dec. 20, 2005, entitled "VIDEO SOURCE RATE CONTROL FOR VIDEO TELEPHONY", which claims priority to co-assigned U.S. Provisional Application No. 60/731,614, filed on Oct. 27, 2005, entitled "CONTROLLED-DELAY RATE CONTROL FOR WIRELESS VIDEO TELEPHONY", which are hereby incorporated by reference in their entirety.

This application also claims priority to U.S. Provisional Application No. 60/729,017, filed on Oct. 21, 2005, entitled "METHODS AND SYSTEMS FOR ADAPTIVE REAL-TIME INFORMATION ENCODING IN WIRELESS COMMUNICATIONS", which is hereby incorporated by reference in its entirety. This application also claims priority to U.S. Provisional Application No. 60/797,260 filed May 2, 2006, entitled "VIDEO RATE ADAPTATION TO REVERSE LINK CONDITIONS", which is hereby incorporated by reference in its entirety.

This application is related to and incorporates by reference co-assigned U.S. patent application Ser. No. 11/240,133, filed on Sep. 29, 2005, entitled "VIDEO PACKET SHAPING FOR VIDEO TELEPHONY", and U.S. patent application Ser. No. 11/315,399, filed on Dec. 21, 2005, entitled "METHODS AND SYSTEMS FOR ADAPTIVE ENCODING OF REAL-TIME INFORMATION IN PACKET-SWITCHED WIRELESS COMMUNICATION SYSTEMS".

TECHNICAL FIELD

The disclosure relates to video encoding and, more particularly, techniques for adapting a video encoding rate to reverse link conditions.

BACKGROUND

A cellular phone may include an audio capture device, such as a microphone or speech synthesizer, and an audio encoder to generate audio packets (or frames). The phone may use communication protocol layers, such as radio link protocol (RLP), medium access control (MAC), and physical (PHY) layers. The phone may place audio packets in a RLP queue. A MAC layer module may generate MAC layer packets from contents of the RLP queue. The MAC layer packets may be converted to PHY layer packets for transmission across a communication channel to another communication device.

SUMMARY

One aspect relates to a method comprising: estimating video throughput based on a size of a video flow radio link protocol (RLP) queue at an access terminal; and encoding video data using the estimated video throughput.

Another aspect relates to a method comprising: determining a first size $V_n$ of a video queue in a radio link protocol (RLP) layer at a first time $t_n$ based on a video frame rate; determining a second size $V_m$ of the video queue at a second time $t_m$ based on an audio frame rate; if the first size $V_n$ or the second size $V_m$ is greater than zero, then using the first size $V_n$, a previous size $V_{n-1}$ of the video queue associated with a previous video frame, a previous video frame size $B_{n-1}$, the first time $t_n$, and a time $t_{n-1}$ associated with the previous size of the video queue to determine a video throughput VTP; if the first size $V_n$ and the second size $V_m$ are equal to zero, then searching for an earlier time based on the audio frame rate when the video queue size was greater than zero; after finding the earlier time based on the audio frame rate when the video queue size was greater than zero, using an earlier queue size $V_{m-i}$ based on the audio frame rate, the previous size $V_{n-1}$ of the video queue associated with the previous video frame, the previous video frame size $B_{n-1}$, the earlier time $t_{m-1}$, and the time $t_{n-1}$ associated with the previous size of the video queue to determine a video throughput VTP; using the determined video throughput VTP to determine a channel-constrained video frame size; and using the channel-constrained video frame size to control a video encoding rate.

Another aspect relates to a method comprising: determining a size of a video queue in a radio link protocol (RLP) layer; determining a power headroom limitation from a medium access control (MAC) layer; using the determined power headroom limitation to determine a MAC payload size; using the determined MAC payload size and an estimate of how many transmission opportunities are given to video in a time period to determine video throughput; using the determined video throughput and the determined size of the video queue in the RLP layer to determine a channel-constrained video frame size; and using the channel-constrained video frame size to control a video encoding rate.

Another aspect relates to an apparatus comprising a machine-readable memory that stores a set of instructions. The instructions are configured to: determine a first size $V_n$ of a video queue in a radio link protocol (RLP) layer at a first time $t_n$ based on a video frame rate; determine a second size $V_m$ of the video queue at a second time tm based on an audio frame rate; if the first size $V_n$ or the second size $V_m$ is greater than zero, then use the first size $V_n$, a previous size $V_{n-1}$ of the video queue associated with a previous video frame, a previous video frame size $B_{n-1}$, the first time $t_n$, and a time $t_{n-1}$ associated with the previous size of the video queue to determine a video throughput VTP; if the first size $V_n$ and the second size $V_m$ are equal to zero, then searching for an earlier time based on the audio frame rate when the video queue size was greater than zero; after finding the earlier time based on the audio frame rate when the video queue size was greater than zero, use an earlier queue size $V_{m-i}$ based on the audio frame rate, the previous size $V_{n-1}$ of the video queue associated with the previous video frame, the previous video frame size $B_{n-1}$, the earlier time $t_{m-1}$, and the time $t_{n-1}$ associated with the previous size of the video queue to determine a video throughput VTP; use the determined video throughput VTP to determine a channel-constrained video frame size; and use the channel-constrained video frame size to control a video encoding rate.

Another aspect relates to an apparatus comprising a machine-readable memory that stores a set of instructions. The instructions are configured to: determine a size of a video queue in a radio link protocol (RLP) layer; determine a power headroom limitation from a medium access control (MAC) layer; use the determined power headroom limitation to determine a MAC payload size; use the determined MAC payload size and an estimate of how many transmission opportunities are given to video in a time period to determine video throughput; use the determined video throughput and the determined size of the video queue in the RLP layer to determine a channel-constrained video frame size; and use the channel-constrained video frame size to control a video encoding rate.

Another aspect relates to an apparatus comprising: a radio link protocol (RLP) layer queue configured to store video data; a first unit configured to receive a size of the RLP video queue and a power headroom limitation from a medium access control (MAC) layer, use the power headroom limitation to determine a MAC payload size, use the determined MAC payload size and an estimate of how many transmission opportunities are given to video in a time period to determine video throughput, and use the determined video throughput and the size of the video queue in the RLP layer to determine a channel-constrained video frame size; a second unit to use the channel-constrained video frame size to control a video encoding rate; and a video encoder to use the video encoding rate to encode video.

Another aspect relates to apparatus comprising: means to determine a size of a video queue in a radio link protocol (RLP) layer; means to determine a power headroom limitation from a medium access control (MAC) layer; means to use the determined power headroom limitation to determine a MAC payload size; means to use the determined MAC payload size and an estimate of how many transmission opportunities are given to video in a time period to determine video throughput; means to use the determined video throughput and the determined size of the video queue in the RLP layer to determine a channel-constrained video frame size; and means to use the channel-constrained video frame size to control a video encoding rate.

The details of one or more embodiments are set forth in the accompanying drawings and the description below.

BRIEF DESCRIPTION OF DRAWINGS

FIGS. 2A and 2B illustrate simulated data showing increased video delay when reverse link (RL) channel conditions are poor.

FIGS. 5B-5E illustrate examples of determining RLP queue size.

FIGS. 7A-7B illustrate tables to convert power headroom limitation to maximum payload size.

DETAILED DESCRIPTION

Figure 1:
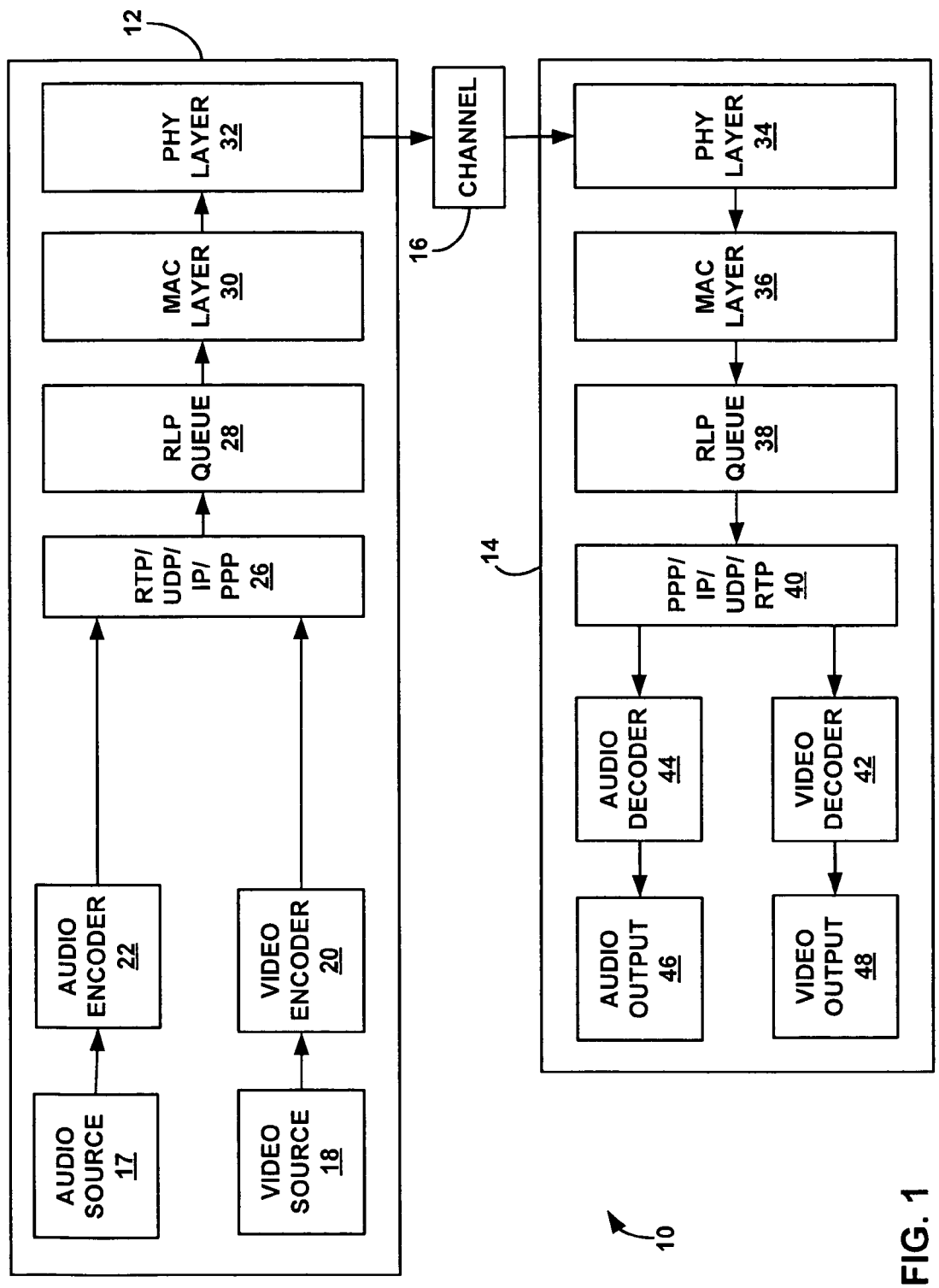
FIG. 1 illustrates a video encoding and decoding system.

FIG. 1 illustrates a video encoding and decoding system 10. The system 10 includes an encoder system 12 sending data across a transmission channel 16 to a decoder system 14. The encoder system 12 may be in a first video communication device and may include an audio source 17, video source 18, video encoder 20, audio encoder 22, real-time transport protocol (RTP)/user datagram protocol (UDP)/Internet protocol (IP)/point-to-point protocol (PPP) conversion module 26, radio link protocol (RLP) queue 28, MAC layer module 30 and physical (PHY) layer module 32. Other embodiments of the encoder system 12 may include other elements instead of or in addition to the elements shown in FIG. 1. Other embodiments of the encoder system 12 may include fewer elements than those shown in FIG. 1.

The decoder system 14 may be in another video communication device and may include a PHY layer module 34, MAC layer module 36, RLP queue 38, RTP/UDP/IP/PPP conversion module 40, video decoder 42, audio decoder 44, audio output unit 46 and video output unit 48. Other embodiments of the decoder system 14 may include other elements instead of or in addition to the elements shown in FIG. 1. Other embodiments of the decoder system 14 may include fewer elements than those shown in FIG. 1.

System 10 may provide bi-directional video and audio transmission, e.g., for video telephony (VT) via transmission channel 16. Reciprocal encoding, decoding, and conversion modules may be provided on opposite ends of channel 16. In some embodiments, encoder system 12 and decoder system 14 may be embodied within video communication devices such as wireless mobile terminals equipped for video streaming, VT, or both. The mobile terminals may support VT according to packet-switched standards such as RTP, UDP, IP, or PPP.

RTP/UDP/IP/PPP conversion module 26 adds appropriate RTP/UDP/IP/PPP header data to audio and video data received from audio encoder 22 and video encoder 20, and places the data in RLP queue 28. RTP runs on top of UDP, while UDP runs on top of IP, and IP runs on top of PPP. MAC layer module 30 generates MAC RLP packets from the contents of RLP queue 28. PHY layer module 32 converts the MAC RLP packets into PHY layer packets for transmission over channel 16.

PHY layer module 34 and MAC layer module 36 of decoding system 14 operate in a reciprocal manner. PHY layer module 34 converts PHY layer packets received from channel 16 to MAC RLP packets. MAC layer module 36 places the MAC RLP packets into RLP queue 38. RTP/UDP/IP/PPP conversion module 40 strips the header information from the data in RLP queue 38, and reassembles the video and audio data for delivery to video decoder 42 and audio decoder 44, respectively.

System 10 may be designed to support one or more wireless communication technologies such as code division multiple access (CDMA), frequency division multiple access (FDMA), time division multiple access (TDMA), or orthogonal frequency divisional multiplexing (OFDM), or another suitable wireless technique. The above wireless communication technologies may be delivered according to any of a variety of radio access technologies. For example, CDMA may be delivered according to cdma2000 or wideband CDMA (WCDMA) standards. TDMA may be delivered according to the Global System for Mobile Communications (GSM) standard. The Universal Mobile Telecommunication System (UMTS) standard permits GSM or WCDMA operation. For VT applications, system 10 may be designed to support high data rate (HDR) technologies such as cdma2000 1x EV-DO, Release 0, Revision A or subsequent EV-DO releases.

The video source 18 may be a video capture device, such as one or more video cameras, one or more video archives, or a combination of video cameras and video archives. The video encoder 20 generates encoded video data according to a video compression method, such as MPEG-4. Other video compression methods may be used, such as the International Telecommunication Union (ITU) H.263, ITU H.264, or MPEG-2 methods. Video encoder 20 may provide a video source rate control scheme that is generally CODEC-dependent. For example, video encoder 20 may be adapted for video encoding according to MPEG4, ITU H.263 or ITU H.264. Video encoder 20 may be implemented by a DSP or embedded logic core.

The audio source 17 may be an audio capture device, such as a microphone, or a speech synthesizer device. The audio encoder 22 may encode audio data to accompany the video data. The audio data may be encoded according to an audio compression method, such as adaptive multi-rate narrow band (AMR-NB), or other techniques. For VT applications, the video will permit viewing of a party to a VT conference, and the audio will permit the speaking voice of that party to be heard.

In operation, RTP/UDP/IP/PPP conversion module 26 obtains video and audio data packets from video encoder 20 and audio encoder 22. RTP/UDP/IP/PPP conversion module 26 adds appropriate header information to the audio packets and inserts the resulting data within RLP queue 28. Likewise, RTP/UDP/IP/PPP conversion module 26 adds appropriate header information to the video packets and inserts the resulting data within RLP queue 28. MAC layer module 30 retrieves data from RLP queue 28 and forms MAC layer packets. Each MAC layer packet carries RTP/UDP/IP/PPP header information and audio or video packet data that is contained within RLP queue 28.

Audio packets may be inserted into RLP queue 28 independently of video packets. In some cases, a MAC layer packet generated from the contents of RLP queue 28 will carry only header information and video packet data. In other cases, the MAC layer packet will carry only header information and audio packet data.

In some cases, the MAC layer packet will carry header information, audio packet data and video packet data, depending on the contents of RLP queue 28. The MAC layer packets may be configured according to a radio link protocol (RLP), and may be referred to as MAC RLP packets. PHY layer module 32 converts the MAC RLP audio-video packets into PHY layer packets for transmission across channel 16.

Channel 16 carries the PHY layer packets to decoder system 14. For example, channel 16 may be a wired connection, such as a local or wide-area wired network. Alternatively, as described herein, channel 16 may be a wireless channel such as a cellular, satellite or optical channel.

Channel conditions may be a concern for wired and wireless channels, but are especially problematic for mobile VT applications performed over a wireless channel 16, in which channel conditions may suffer due to fading or congestion. For example, channel 16 may be characterized by a reverse link (RL) having a throughput that varies according to channel conditions. Throughput may be estimated based on channel conditions, as represented by one or more of current wireless channel transmit rate, wireless base station activity, and transmit power limitations. For example, the channel conditions may be determined based on current MAC layer data rate, a reverse activity bit (RAB), and a power amplifier (PA) limit.

Video encoder 20 may maintain a virtual video buffer representing an amount of the encoded video relative to a target encoding rate. The target encoding rate may be a maximum encoding rate specified for video packets transmitted over channel 16. Video encoder 20 may control an actual encoding rate of the video from video source 18.

PHY layer module 34 of decoder system 14 identifies the MAC layer packets from the PHY layer packets and reassembles the content into MAC RLP packets. MAC layer module 36 then reassembles the contents of the MAC RLP packets to provide video and audio packets for insertion within RLP queue 38. RTP/UDP/IP/PPP module 40 removes the accompanying header information and provides video packets to video decoder 42 and audio packets to audio decoder 44.

Video decoder 42 decodes the video data frames to produce a stream of video data for use in driving a display device. Audio decoder 44 decodes the audio data to produce audio information for presentation to a user, e.g., via an audio speaker.

Video telephony (VT) refers to real-time communication of packets carrying audio and video data between at least two devices, such as systems 12 and 14. A first VT device 12 includes a video encoder 20 that obtains video from a video capture device 18, such as a video camera or video archive, and generates video packets. Similarly, an audio encoder 22 in the VT device 12 obtains audio from an audio capture device 17, such as a microphone or speech synthesizer, and generates audio packets. The video packets and audio packets are placed in a RLP queue 28. A MAC layer module 30 generates MAC layer packets from the contents of the RLP queue 28. The MAC layer packets are converted to PHY layer packets for transmission across a communication channel 16 to a second VT device 14.

In mobile VT applications, a VT device (wireless terminal) receives PHY layer packets via a wireless forward link (FL) (i.e., "downlink") from a base station. A VT device transmits PHY layer packets via a wireless reverse link (RL) (i.e., "uplink") to a base station. Each VT device includes PHY and MAC layers to convert the received PHY and MAC layer packets and reassemble the packet payloads into audio packets and video packets. A video decoder 42 within the VT device decodes the video data for presentation to a user via a display device (video output) 48. An audio decoder 44 within the VT device decodes the audio data for output via an audio speaker (audio output) 46.

Mobile VT in a wireless environment may be challenging because the data rate over the wireless channel may be limited and may vary with time. For example, in a CDMA2000 1x EV-DO Release 0 or Revision A network, the data rate may vary due to channel conditions within a wireless coverage area or traffic congestion among multiple VT users. Channel conditions, excessive video content, or both can cause significant delays in transmission of video. For example, when RL throughput is reduced, video transmission can overwhelm the RL and increase video transmission delay. As a result, mobile VT can be susceptible to undesirable video and/or audio delay, which undermines the ability to provide smooth video conferencing in real-time.

The description below provides techniques for video rate adaptation (controlling the encoding rate of source video) for applications, such as VT, to reduce video delay over a range of channel conditions. The video source rate adaptation may be called channel-adaptive. The techniques may be effective in reducing degradation of spatial and temporal quality when the video source encoding rate is reduced due to channel conditions or excessive video content or complexity.

Performance of video source encoding rate control can be evaluated by end-to-end delay, which is delay of video transmission between a sender and a recipient, e.g., in a mobile wireless VT system. End-to-end delay may include buffering and transmission delays, spatial visual quality, number of skipped video frames, encoder buffer underflow, which indicates bandwidth underutilization, encoder buffer overflow, which causes frame skipping, decoder buffer underflow, which indicates there is no data to decode and less display refresh, decoder buffer overflow, which indicates lost data, receiver display refresh rate, audio-video synchronization, encoder-side peak signal to noise ratio (PSNR), and initial buffer delay following a first intra (I) frame.

Video telephony (VT) may be an important application for CDMA2000 1x EV-DO Rev A networks. EV-DO Rev A may provide data rates up to 3.1 Mbps on forward link (FL) (downlink) and 1.8 Mbps on RL (uplink). EV-DO Rev A also supports intra- and inter-user quality of service (QoS). Intra-user QoS gives audio data higher priority than video data, which reduces audio delay by trading off video delay when channel conditions degrade. Compared to an EV-DO Release 0 network, EV-DO Rev A's more symmetric, higher data rates and QoS support may be more suitable to carry bandwidth-demanding, delay-sensitive traffic and may enhance overall VT quality.

Although an EV-DO Rev A network provides unique features that accommodate VT traffic, one challenging problem may be excessive video delay when underlying channel conditions become poor. This usually happens when a VT mobile device user experiences faded channels or moves to an edge of a sector and becomes headroom limited. Because intra-user QoS is supported, audio will be served and transmitted with a higher priority than video. There may even be some moments when there is no bandwidth to transmit any video. As a result, video data will be queued in a buffer until the resource is freed up from audio data or after channel conditions improve.

FIGS. 2A and 2B illustrate simulated data showing increased video delay when RL channel conditions are poor. The simulation sends 48 kbps, 15 frames per second (fps) MPEG-4 compressed video and enhanced variable rate coder (EVRC) encoded audio with 3-frame bundling over EV-DO Rev A RL channel emulators. The FL can also cause additional video delay, but the FL problem is independent from the RL. The RL rate adaptation techniques described below may help improve overall end-to-end video delay.

FIG. 2A shows different channel conditions in the simulation. In this simulation, the network load is light, i.e., there are few users in the same sector. In this simulation, the MAC layer design for VT flows does not react to sector loading. This means that RL resource allocation will guarantee 48 kbps video transmission, unless the access terminal is power headroom limited. When power headroom is limited (or RL condition gets poor), the MAC layer 30 will transmit audio data before video data. Different channel conditions are simulated by different slow fading situations in FIG. 2A. Condition 2 in FIG. 2A uses Channel-A time-varying shadow, which simulates an access terminal (AT) slowly moving about 3 kilometers per hour (kmph). When the AT moves into fading areas, it will tend to stay there for a longer period of time, as compared to conditions 4 and 6, where the AT moves faster at about 10 kmph and 120 kmph, respectively. The simulations were also done with and without soft handoff. Typically, the channel conditions without soft handoff are worse than those with soft handoff.

FIG. 2B shows audio and video delays when audio and video are transmitted over all the test channel conditions of FIG. 2A. As FIG. 2B shows, the audio delay does not increase much for all the channel conditions. This is because the QoS supported by an EV-DO Rev A reverse link provides priority transmission for audio data over video. When RL bandwidth decreases, RL will allocate available resources to audio data first and then allocate the remaining resources to video data transmission. When the RL condition is poor, audio data uses most of the resources (or bandwidth), while video data will be buffered in a transmission queue (or video flow RLP queue 28). As a result, video delay increases dramatically as shown in FIG. 2B.

The simulation collected data by sending audio and video for five minutes. The delay is measured for each video frame. For conditions 2 through 5, the video has long delays up to 2 seconds on average. The cumulative delay distribution at 95% can be as high as up to 12.5 seconds. These values are the results of five minutes of experiment time, assuming that the RLP queue has unlimited physical memory to store video data.

If the time was increased to 20 minutes, these values would even be worse. That is, the video flow RLP queue will grow large because the AT is unable to sustain 48 kbps video transmission. This is unacceptable for real-time VT applications. The main reason is that the video encoder 20 is not aware of channel degradation and continues to produce 48 kbps video to send across the RL. Since the RL cannot support video data at such a high rate during channel fading, most of the video data will be buffered. This buffering causes delay.

Therefore, it is highly desirable to adjust the video encoding rate to match what the RL can support to avoid any video data being buffered to reduce video delay. A video delay target at 95% may be 200 ms.

The description below describes new video rate adaptation techniques for video telephony applications, such as video conferencing and video sharing. These techniques are described with a CDMA2000 EV-DO Rev A network, but other types of networks may be used. These techniques address the problem of increased video delay when channel conditions deteriorate on the RL.

One proposed method is a cross-layer optimization design that takes characteristics of EV-DO Rev A RL into account and uses information from the MAC layer 30 and RLP layer 28 passed to the video encoder 20. The video encoder 20 uses this information to monitor RL conditions and adjust its encoding rate according to the channel condition.

Simulation results show that the method can effectively reduce average video delay by up to 94%, and the 95 percentile delay (delay value within which the decoder 42 will receive 95% of the video packets transmitted by the encoder 20) can be improved by up to 98% for different channel conditions, assuming that the RLP queue has unlimited physical memory to store video data. In addition, the effective video throughput can be increased by up to 4 kilobits per second (kbps). The computational complexity of the proposed method may be low, so it can be implemented in computation-limited mobile devices.

Correlation Between Video Delay and Lower-Layer Information

Figure 3:
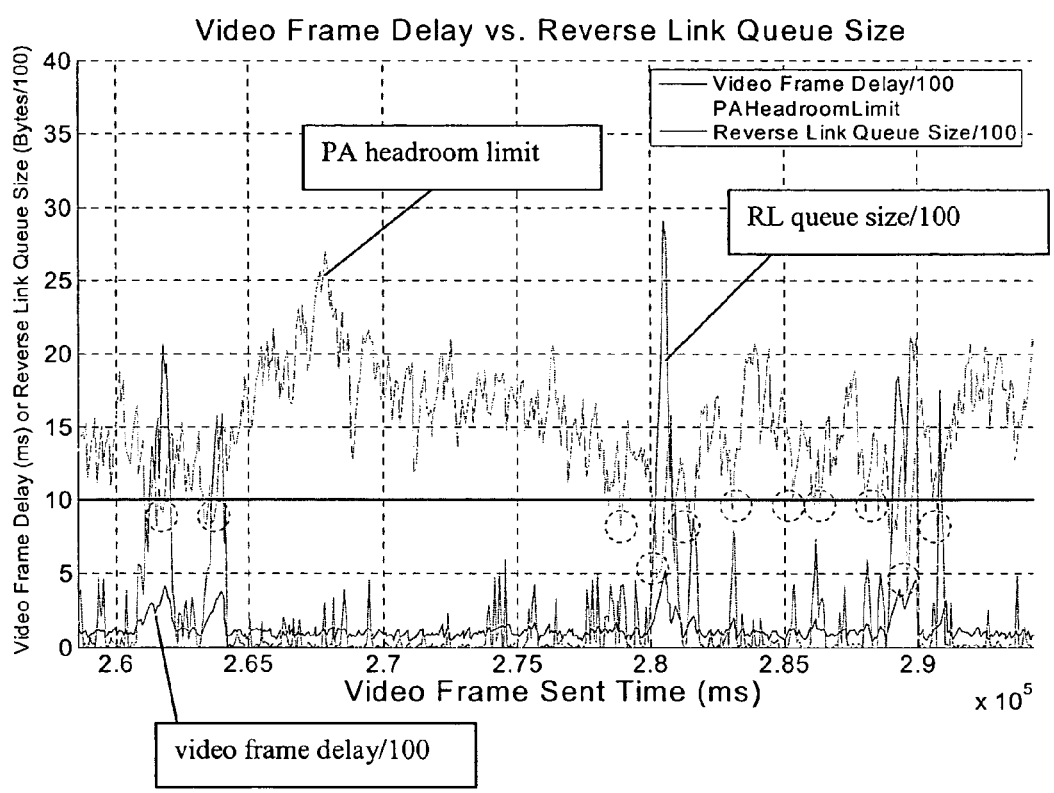
FIG. 3 illustrates a correlation between (a) video delay of each frame and (b) lower-layer information.

FIG. 3 illustrates a correlation between (a) video delay (in milliseconds and divided by 100) of each frame according to the time when the frame was generated and (b) lower-layer information, e.g., video flow RLP queue size (in bytes and divided by 100) from RLP layer and power headroom limitation from MAC layer. Power headroom limitation is measured in decibels (dBs) and limits the maximum possible payload size of MAC layer packets. The lower the power headroom limitation value is, the smaller the maximum possible payload size is, and hence the lower the throughput. The headroom limitation may indicate the maximum rate that is allowed to be used in transmission, based on the current transmit power. The PA limit represents transmit power headroom and indicates when channel conditions have degraded.

FIG. 3 shows a strong correlation between video flow RLP queue size and video delay. When the RLP queue size increases, video delay also increases, such as times around 2.62, 2.8 and 2.9 along the x-axis in FIG. 3.

There is also a strong correlation between power headroom limitation and video delay. When the power headroom limitation is below 10 dB, as circled in FIG. 3, the video delay is increased. The lower the power headroom limitation is, the larger the video delay is. Based on these observations, video flow RLP queue size and power headroom limitation seem to be very useful information for video rate adaptation.

Video Rate Adaptation Using EV-DO Rev A RL MAC Parameters

Two different video rate adaptation techniques are described to reduce video delay. Both methods use information from lower layers such as the MAC and RLP. Either technique can be applied with different delay performance, depending on what information can be obtained from the lower layers.

The first technique is based solely on video flow RLP queue size. The second technique is an enhanced version based on both video flow RLP queue size and power headroom limitation. The second technique addresses drawbacks of the first technique and has less (it is less because more reliable information is available in the second enhanced approach so that it does not need to do as much as in the first approach to try to get accurate video throughput estimation) computation complexity but better delay performance without sacrificing effective video throughput.

One may implement either technique based which information is available without waiting for all information to be ready. If more information is available, the second technique may improve delay performance further. In general, rate adaptation may use all possible information from lower layers, in addition to video flow queue size and power headroom limitation. More MAC information may be passed to the video encoder 20 in order to allow more accurate and flexible rate adaptation. The description below focuses on how to use queue size and power headroom limitation as examples to do rate adaptation.

First Rate Adaptation Technique

There may be two different constraints for rate adaptation. A first possible constraint may be bit-rate constraint, which may guarantee 48-Kbps video data rate even when the channel 16 can afford higher rates. Some systems or networks may not have this bit-rate constraint. A second constraint is channel constraint, which will limit the video rate based on the current channel conditions.

Figure 4:
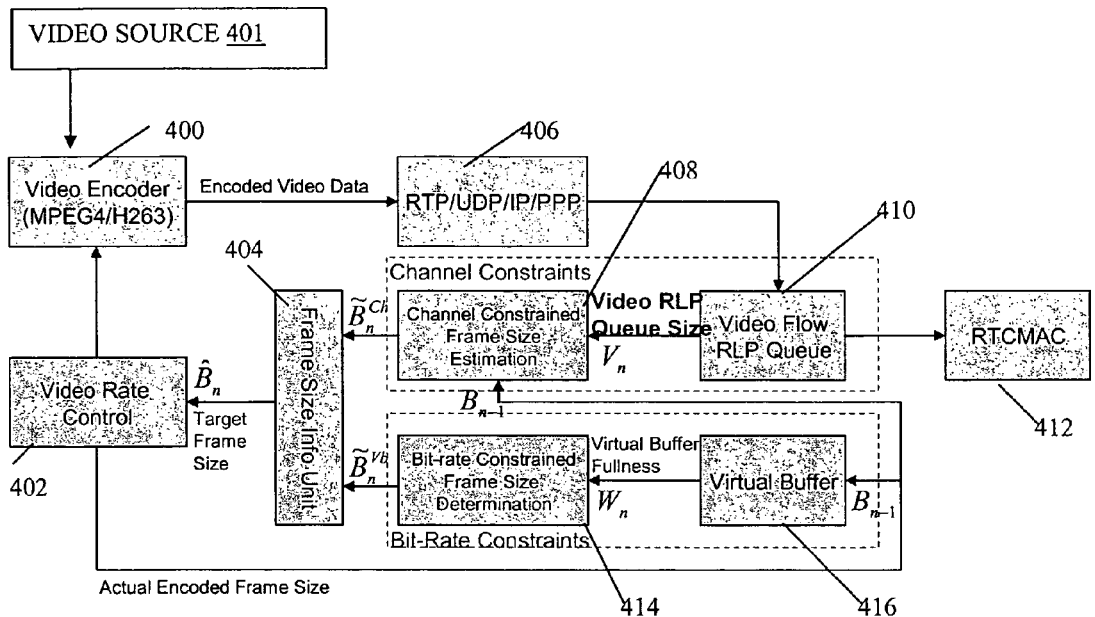
FIG. 4 illustrates a first rate adaptation technique with examples of structures and data flows.

FIG. 4 illustrates a first rate adaptation technique with examples of structures and data flows. A video encoder 400 encodes video data from a video source 401 using a video encoding rate from video rate control unit 402. The video encoder 400 sends encoded video data to a RTP/UDP/IP/PPP unit 406, which sends video packets to the video flow RLP queue 410. The video flow RLP queue 410 sends video packets to the reverse traffic channel MAC (RTCMAC) 412. The RTCMAC implements a protocol to provide procedures followed by a communication device to transmit over the RL of channel 16.

A large video flow RLP queue size may indicate that video data has a long delay. The video encoder 400 and/or other units in FIG. 4 may frequently monitor video flow RLP queue size and adjust the video encoding rate when necessary.

One way to adjust video rate is to look at the instantaneous video RLP queue size and skip one frame when the size exceeds a threshold. This approach may incur too many skipped frames and may not provide graceful video quality degradation. A better approach is to look at first-order statistics of video RLP queue size to estimate the available video throughput, which can be used to determine the current frame size.

The video encoder 400 may allocate bits for each frame (i.e., determine frame size) on a frame-by-frame basis. For instance, for 15-fps video, the frame size info unit 404 may decide the size of each frame every 66 ms. If the RL is not power headroom limited, and the sector is not loaded, the frame size info unit 404 allocates frame size based on a target bit rate constraint 414. Otherwise, the channel constrained frame size estimation unit 408 needs to know the amount of data to generate and not overwhelm the RL. Therefore, the channel constrained frame size estimation unit 408 estimates a maximum amount of data that the RL can handle between two consecutive video frames. An estimation error will be reflected in video flow RLP queue size, and this will be taken into account when the channel constrained frame size estimation unit 408 decides the frame size of the next frame.

Step 1: Get Video Flow RLP Queue Size

The channel-constrained frame size estimation unit 408 will query the RLP layer periodically to retrieve video flow RLP queue size V.

Figure 5A:
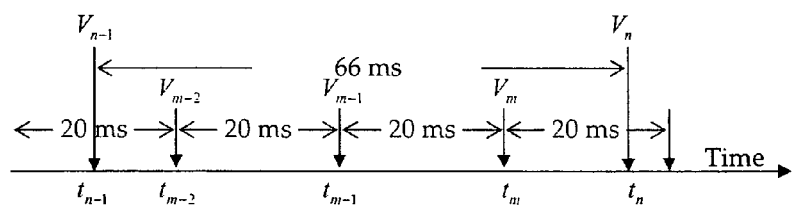
FIG. 5A illustrates a frequency of application layer inquiries to a lower layer to get video flow RLP queue size, where the frequency is based on an audio frame rate and a video frame rate.

FIG. 5A illustrates a frequency of application layer inquiries to the RLP layer to get video flow RLP queue size, where the frequency is based on audio frame rate (every 20 ms) and video frame rate (every 66 ms if encoded at 15 fps). The video frame rate in FIG. 5A is a time period for the video encoder 400 to encode a frame n−1 of size $B_{n-1}$. The channel-constrained frame size estimation unit 408 may separate information queried based on an audio timer and a video timer. When RLP queue size is queried based on the audio timer, the channel-constrained frame size estimation unit 408 may record/store the queue size and the queried time as $(V_m, t_m)$. The audio timer is normally every 20 ms but may be 10 ms or 30 ms, depending on what speech encoder is used.

When RLP queue size is queried based on the video timer, the channel-constrained frame size estimation unit 408 may record/store the queue size and the queried time as $(V_n, t_n)$, as illustrated in FIG. 5A. The video timer is the time interval between two consecutive frames and is based on frame rate. For 15-fps video frame rate, the video timer is every 66 ms.

If the channel-constrained frame size estimation unit 408 only queries RLP queue size using the video timer, $V_n$ could be zero, and the channel-constrained frame size estimation unit 408 would not know when the RL finishes transmission in the queue 410 during $t_n$ and $t_{n-1}$. Thus, channel throughput may be under-estimated. This is a reason for using the audio timer to query RLP queue size more frequently. By allowing more frequent queries to the RLP layer, the channel-constrained frame size estimation unit 408 can keep track when the RLP queue 410 becomes empty.

A method for finding $V_x$ and $t_x$ may be expressed as:

```
if(V_n > 0) or (V_m > 0)
        V_x = V_n; t_x = t_n;
else
    i = 1;
    loop
    {
        if((t_{m-i} > t_{n-1}) and (V_{m-i} > 0)) or (t_{m-i} <= t_{n-1})
        {
            V_x = V_{m-i+1}; t_x = t_{m-i+1};
            Done and stop the loop;
        }
        else i = i + 1;
    }
```

$(V_x, t_x)$ will be used to calculate video throughput, as described below. FIG. 5A shows only 3 queries based on audio timer. This is based on the frame rate of 15 fps. If a lower frame rate such as 7.5 fps or 5 fps is used, there will be more queries, and the process above should be modified to be more generic. The method above is for searching when RLP video queue 410 becomes zero if $V_n$ is zero. If $V_n$ is not zero, the channel constrained frame size estimation unit 408 will use $t_n$ as the time $t_x$ and estimate the video throughput (described below) because the channel cannot flush out data that was generated at time $t_{n-1}$.

FIGS. 5B-5E illustrate examples of determining RLP queue size using the method above. In FIG. 5B, the method determines if ($V_n$>0) or ($V_m$>0). Since $V_m$>0, the method sets $V_x=V_n$ and $t_x=t_n$ because $t_n$ is the time when the RLP queue size becomes zero. This means the channel consumes 550 bytes in between $t_{n-1}$ and $t_n$.

In FIG. 5C, the method determines if ($V_n$>0) or ($V_m$>0). The answer is no, which means the RLP queue size becomes zero earlier than $V_m$. In this case, the method cannot set $V_x=V_n$; $t_x=t_n$. The method needs to find when the RLP queue size becomes zero. The method searches from $V_m$ to all earlier times $V_{m-1}$, $V_{m-2}$ to find when RLP queue size becomes zero. The method sets i=1. The method determines whether $V_{m-i}$ (where i=1) is equal to zero. The answer is no because $V_{m-i}$ is 150 bytes. Then the method knows tm is the time when RLP queue size becomes zero. Then the method can set $V_x=V_m$ and $t_x=t_m$ (where m−i+1=m in this case).

In FIG. 5D, the method determines if ($V_n$>0) or ($V_m$>0). The answer is no, which means the RLP queue size becomes zero earlier than $V_m$. In this case, the method cannot set $V_x=V_n$; $t_x=t_n$. The method needs to determine when the RLP queue size becomes zero. The method searches from Vm to all earlier times $V_{m-1}$, $V_{m-2}$ to find when RLP queue size becomes zero. The method sets i=1. The method determines whether $V_{m-i}$ (where i=1) is equal to zero. The answer is yes, and the method increases by 1. Now i=2. The method determines whether $V_{m-i}$ (where i=2) is equal to zero. The answer is no, $V_{m-i}$ is 250 bytes. Then the method knows tm−1 (where m−i+1=m−1) is the time when RLP queue size becomes zero. Then, the method can set $V_x=V_{m-1}$; $t_x=t_{m-1}$.

In FIG. 5E, the method determines if ($V_n$>0) or ($V_m$>0). The answer is no, which means the RLP queue size becomes zero earlier than $V_m$. In this case, the method cannot set $V_x=V_n$; $t_x=t_n$. The method needs to determine when the RLP queue size becomes zero. The method searches from Vm to all earlier times $V_{m-1}$, $V_{m-2}$ to find when RLP queue size becomes zero. The method sets i=1. The method determines whether $V_{m-i}$ (where i=1) is equal to zero. The answer is yes, and the method increases by 1. Now i=2. The method determines whether $V_{m-i}$ (where i=2) is equal to zero. The answer is yes, and the method increases i by 1. Now i=3. Now $t_{m-i}$ is earlier than $t_{n-1}$. This means the method has checked all the RLP queue sizes in between two video frames. In this case, the method will set $V_x=V_{m-2}$; $t_x=t_{m-2}$ (where m−i+1=m−2).

In this method that uses RLP queue size, the basic idea of determining $V_x$ and $t_x$ is to search when the RLP queue size becomes zero, if $V_n$ is zero. This is because if $V_n$ is zero, the method does not know when the RL transmits all the data and hence the estimation may under-estimate the channel bandwidth. If $V_n$ is not zero, the method can simply use tn as the time and estimate the video throughput.

Step 2: Estimate Video Throughput

Video throughput (VTP) since the last time a frame has been sent at time $t_{n-1}$ to the current frame at time $t_n$ before encoding can be estimated by the channel constrained frame size estimation unit 408 as follows:

$$VTP = \frac{B_{n-1} + V_{n-1} - V_x}{t_x - t_{n-1}},$$

where $B_{n-1}$ is the size of frame n−1. $t_x$ is the time when the video flow RLP queue size becomes empty or equals to $t_n$ if $V_n$ is not zero.

Step 3: Determine Channel-Constrained Maximum Frame Size

After video throughput VTP is estimated, the channel-constrained frame size estimation unit 408 determines the maximum frame size that the RL can afford, assuming that the channel does not change, as follows:

$$\tilde{B}_n^{Ch} = VTP \times \frac{1}{F} - V_n + A(VTP),$$

where F is the frame rate. A(VTP) is an adjusting factor to control how much video encoder 400 reacts to the channel. A(VTP) may be a function of the estimated video throughput. A(VTP) is useful where the previous video frame was small, and VTP underestimates the true bandwidth of the channel 16. A(VTP) can also be used to control video delay according to different delay constraints from different applications. For example, video conferencing may use smaller values of A(VTP), while a video sharing application may use larger values. A(VTP) may be a constant or a variable. An example of A(VTP) is 100 bytes.

Step 4: Determine Target Frame Size

The frame size information unit 404 may determine the target frame size for frame n as follows:

$$\hat{B}_n = \begin{cases} \min(\tilde{B}_n^{Ch}, \tilde{B}_n^{Vb}), & \text{if } \tilde{B}_n^{Ch} > B_{min}, \\ 0, & \text{otherwise,} \end{cases}$$

where $\tilde{B}_n^{Vb}$ is the frame size constrained by virtual buffer 416 with size $W_n$, which is used to control the averaged video bit rate. The virtual buffer 416 may be implemented by memory and software executed by a processor. $B_{min}$ is the minimum frame size that is controlled to guarantee a good image quality.

If the channel constrained frame size is too small, the frame size info unit 404 will skip this frame instead of generating a bad image and wasting bandwidth.

The frame size information unit 404 sends the target frame size to the video rate control unit 402 to determine a video rate. Video rate is equal to video data frame size per time period (e.g., 66 ms).

Although the first rate adaptation technique can successfully reduce video delay, a possible drawback is that it reacts only after the channel degradation has caused video data buffered in the RLP queue 410. This technique may still create a long delay for the frame that is already buffered in the RLP queue 410.

Second Rate Adaptation Technique

Figure 6:
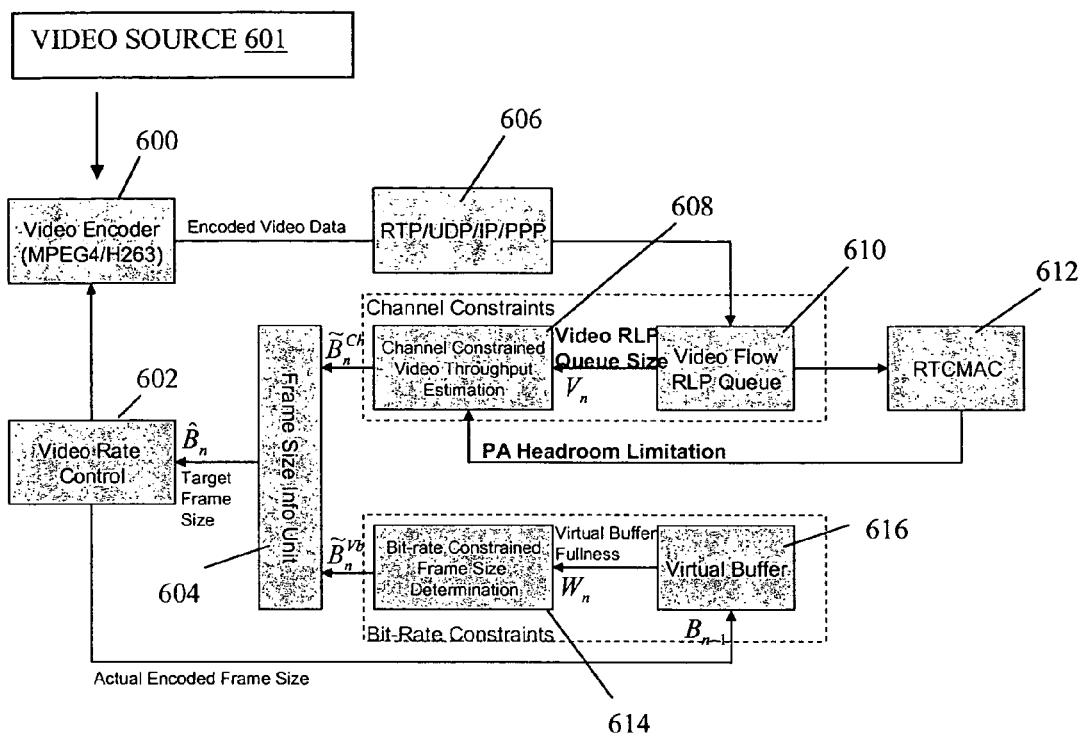
FIG. 6 illustrates a second rate adaptation technique with examples of structures and data flows.

FIG. 6 illustrates a second rate adaptation technique with examples of structures and data flows. In the second rate adaptation technique, a channel-constrained video throughput estimation unit 608 uses additional information (e.g., power amplifier (PA) headroom limitation) from the MAC layer 612 to estimate video throughput. This second technique proactively estimates (or predicts) video throughput based on power headroom limitation, instead of relying on first-order statistics of video flow RLP queue size. The MAC layer 612 uses power headroom limitation as a limiting factor to determine the payload size of MAC packets. The channel-constrained video throughput estimation unit 608 could also use the power headroom limitation to estimate video throughput because the power headroom limitation typically does not change significantly between two consecutive video frames.

Alternatively, if the unit 608 knows the instantaneous MAC payload size before encoding a frame, the unit 608 could use the instantaneous MAC payload size to predict the video throughput. In this way, the unit 608 can determine the frame size more accurately in a proactive way to avoid sending excessive data that overwhelms RL.

Step 1: Get Power Headroom Limitation and Video Flow Queue Size

The channel-constrained video throughput estimation unit 608 queries the RLP layer to get video flow queue size and queries the MAC layer 612 to get power headroom limitation. The query frequency can be every 66 ms. It is not necessary to use an audio timer in this second rate adaptation technique. The unit 608 may store power headroom limitation and video flow RLP queue size.

Step 2: Get MAC Payload Size Based on Table Look-Up

The MAC layer 612 may determine the MAC payload size by table look-up. The MAC layer 612 may maintain a table as shown in FIG. 7A and/or FIG. 7B to convert power headroom limitation to maximum payload size. This conversion can also be used to determine the maximum video throughput in the next step. This conversion may be done in the MAC layer 612 itself, i.e., the MAC layer 612 may pass power headroom limited payload size to the application layer. FIG. 7A illustrates a conversion table for power headroom limitation (the left-most column) and MAC payload size. The effective data rate is also shown with different termination targets.

The table in FIG. 7A is one example. There may be other tables used in MAC to decide the payload size, depending on termination targets and transmission mode (high capacity (HiCap) or low latency (LoLat)). FIG. 7B illustrates other payload size conversions based on power headroom limitation.

Step 3: Estimate Video Throughput

The channel-constrained video throughput estimation unit 608 can predict video throughput as follows:

$$VTP = Payload\_Size * TX\_Opportunities$$

TX_Opportunities is an estimate of how many transmission opportunities are given to video in every 66 ms. TX_Opportunities is determined by taking into account the current MAC design, RL characteristics such as 3-interlace structure, and audio data. For example, TX_Opportunities may be 3, but other values may be used.

Step 4: Determine Channel-Constrained Maximum Frame Size

The channel-constrained video throughput estimation unit 608 can determine channel constrained maximum frame size with the following equation:

$$\tilde{B}_n^{Ch} = VTP - V_n + A(VTP),$$

Step 5: Determine Target Frame Size

The frame size info unit 604 may determine the target size for the current frame.

$$\hat{B}_n = \begin{cases} \min(\tilde{B}_n^{Ch}, \tilde{B}_n^{Vb}), & \text{if } \tilde{B}_n^{Ch} > B_{\min}, \\ 0, & \text{otherwise}, \end{cases}$$

The second rate adaptation technique has lower video delay with comparable video throughput. This means using power headroom limitation can better estimate video throughput. The second rate adaptation technique may meet a delay target of 200 ms at 95% for many cases.

The techniques described in this disclosure may be implemented within a general purpose microprocessor, digital signal processor (DSP), application specific integrated circuit (ASIC), field programmable gate array (FPGA), or other equivalent logic devices. For example, video encoder system 12, and its components and modules, may be implemented as parts of an encoding process, or coding/decoding (CODEC) process, running on a digital signal processor (DSP), microprocessor, embedded core, or other processing device. Accordingly, components described as modules may form hardware components or programmable features of an encoding process, or a separate process.

In some embodiments, encoding functions may be divided among different hardware components. For example, frame-level rate control may be performed in an embedded logic core, and MB-level rate control may be performed in a DSP. As an illustration, given a target bit rate (R Kbps) and a frame rate (F fps), frame-level rate control within the embedded logic core may involve updating rate control model parameters, e.g., rho domain model parameters, after encoding each frame, estimating the frame budget B for the next frame, and mapping the frame budget to a frame QP (e.g., 1 to 31) using budget-to-rho and rho-to-QP mappings, e.g., via either a rho table or a rho parametric equation.

Upon post-processing of the QP values, including any additional constraints on frame QP, the embedded logic core sends the frame QP, rho budget and new model parameters to the DSP. The DSP then calculates the QP for each MB using the rho-to-QP mapping, and performs post-processing of the QP values. The DSP may preserve a rule that the MB delta QP value is within +2 and −2, as well as any additional constraints on MB QPs. Upon updating the rho domain model parameters after encoding a MB, the DSP repeats the process for the other MBs within the applicable video frame. After MB encoding is completed, the process returns to the embedded logic core to handle the next video frame to be encoded.

Video encoder system 12 may have a dedicated memory for storing instructions and data, as well as dedicated hardware, software, firmware, or combinations thereof. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform certain aspects of the functionality described in this disclosure.

The techniques described in this disclosure may be implemented within a general purpose microprocessor, digital signal processor (DSP), application specific integrated circuit (ASIC), field programmable gate array (FPGA), or other equivalent logic devices. For example, video encoder system 12, video decoder system 14, and associated components and modules, may be implemented as parts of an encoding process, or coding/decoding (CODEC) process, running on a digital signal processor (DSP) or other processing device. Accordingly, components described as modules may form programmable features of such a process, or a separate process.

Video encoder system 12 may have a dedicated memory for storing instructions and data, as well as dedicated hardware, software, firmware, or combinations thereof. If implemented in software, the techniques may be embodied as instructions executable by one or more processors. The instructions may be stored on a computer-readable medium such as random access memory (RAM), read-only memory (ROM), non-volatile random access memory (NVRAM), electrically erasable programmable read-only memory (EEPROM), FLASH memory, magnetic or optical data storage device, or the like. The instructions cause one or more processors to perform certain aspects of the functionality described in this disclosure.

Various embodiments have been described. These and other embodiments are within the scope of the following claims.

The invention claimed is:

1. A method of video encoding comprising:
estimating, via an estimation unit of an encoder system, video throughput of a transmission channel based on a size of a video flow radio link protocol (RLP) queue at an access terminal, wherein a transmission rate of data across the transmission channel varies; and
encoding, via an encoder of the encoder system, video data using the estimated video throughput.

2. A method of controlling a video encoding rate, the method comprising:
determining, via an estimation unit of an encoder system, a first size $V_n$ of a video queue in a radio link protocol (RLP) layer at a first time $t_n$ based on a video frame rate;
determining, via the estimation unit, a second size $V_m$ of the video queue at a second time $t_m$ based on an audio frame rate;
if the first size $V_n$ or the second size $V_m$ is greater than zero, then using the first size $V_n$, a previous size $V_{n-1}$ of the video queue associated with a previous video frame, a previous video frame size $B_{n-1}$, the first time $t_n$, and a time $t_{n-1}$ associated with the previous size of the video queue to determine an estimated video throughput VTP of a transmission channel;
if the first size $V_n$ and the second size $V_m$ are equal to zero, then searching for an earlier time based on the audio frame rate when the video queue size was greater than zero;
after finding the earlier time based on the audio frame rate when the video queue size was greater than zero, using an earlier queue size $V_{m-i}$ based on the audio frame rate, the previous size $V_{n-1}$ of the video queue associated with the previous video frame, the previous video frame size $B_{n-1}$, the earlier time $t_{m-1}$, and the time $t_{n-1}$ associated with the previous size of the video queue to determine the estimated video throughput VTP of the transmission channel;
using the estimated video throughput VTP to determine a channel-constrained video frame size; and
using the channel-constrained video frame size to control a video encoding rate.

3. The method of claim 2, wherein using the first size ($V_x$), a previous size ($V_{n-1}$) of the video queue associated with a previous video frame, a previous video frame size ($B_{n-1}$), the first time ($t_x$), and a time ($t_{n-1}$) associated with the previous size of the video queue to determine the estimated video throughput (VTP) comprises:

$$VTP = \frac{B_{n-1} + V_{n-1} - V_x}{t_x - t_{n-1}}.$$

4. The method of claim 2, wherein using the earlier size ($V_x$), the previous size ($V_{n-1}$) of the video queue associated with the previous video frame, the previous video frame size ($B_{n-1}$), the earlier time ($t_x$), and the time ($t_{n-1}$) associated with the previous size of the video queue to determine the estimated video throughput (VTP) comprises:

$$VTP = \frac{B_{n-1} + V_{n-1} - V_x}{t_x - t_{n-1}}.$$

5. The method of claim 2, further comprising if the first size and the second size are equal to zero, and a third size of the video queue associated with a previous audio frame is greater than zero, then using the third size, the previous size of the video queue associated with a previous video frame, the previous video frame size, a time associated with the third size, and the time associated with the previous size of the video queue to determine the estimated video throughput.

6. The method of claim 2, wherein the video queue is assigned to only store video packets.

7. The method of claim 2, wherein using the estimated video throughput to determine a channel-constrained video frame size further uses the video frame rate, the first size and an adjustment factor, which controls how much the video encoding rate reacts to channel conditions, wherein a video frame size is determined based on the video frame rate and the estimated video throughput is increased by the adjustment factor.

8. The method of claim 7, wherein the adjustment factor has a first value for video conferencing and a second value for video sharing.

9. The method of claim 2, further comprising:
using the video encoding rate to encode video; and
transmitting the encoded video across a wireless channel using Code Division Multiple Access Evolution Data Optimized Revision A (CDMA EV-DO Rev A) protocols.

10. The method of claim 2, further comprising:
determining whether the channel-constrained video frame size is greater than a minimum frame size threshold;
if the channel-constrained video frame size is greater than the minimum frame size threshold, determining whether the channel-constrained video frame size is smaller than a frame size constrained by a virtual buffer;
if the channel-constrained video frame size is smaller than the frame size constrained by the virtual buffer, then using the channel-constrained video frame size to control the video encoding rate; and
if the channel-constrained video frame size is greater than the frame size constrained by the virtual buffer, then using the frame size constrained by the virtual buffer to control the video encoding rate.

11. A method comprising:
determining, via an estimation unit of an encoder system, a size of a video queue in a radio link protocol (RLP) layer;
determining, via the estimation unit, a transmit power headroom limitation from a medium access control (MAC) layer;
using the determined transmit power headroom limitation to determine a MAC payload size;
using the determined MAC payload size and an estimate of how many transmission opportunities are given to video in a time period to determine an estimated video throughput;
using the estimated video throughput and the determined size of the video queue in the RLP layer to determine a channel-constrained video frame size; and using the channel-constrained video frame size to control a video encoding rate.

12. The method of claim 11, wherein using the estimated video throughput and the determined size of the video queue in the RLP layer to determine a channel-constrained video frame size further uses an adjustment factor, which controls how much the video encoding rate reacts to channel conditions.

13. The method of claim 12, wherein the adjustment factor has a first value for video conferencing and a second value for video sharing.

14. The method of claim 11, further comprising:
   determining whether the channel-constrained video frame size is greater than a minimum frame size threshold;
   if the channel-constrained video frame size is greater than the minimum frame size threshold, determining whether the channel-constrained video frame size is smaller than a frame size constrained by a virtual buffer;
   if the channel-constrained video frame size is smaller than the frame size constrained by the virtual buffer, then using the channel-constrained video frame size to control the video encoding rate; and
   if the channel-constrained video frame size is greater than the frame size constrained by the virtual buffer, then using the frame size constrained by the virtual buffer to control the video encoding rate.

15. The method of claim 11, further comprising:
   using the video encoding rate to encode video; and
   transmitting the encoded video across a wireless channel using Code Division Multiple Access Evolution Data Optimized Revision A (CDMA EV-DO Rev A) protocols.

16. The method of claim 11, wherein the video queue is assigned to only store video packets.

17. An apparatus that encodes video data, the apparatus comprising a processor and a machine-readable memory storing a set of instructions that, when executed by the processor, cause the apparatus to:
   determine a first size $V_n$ of a video queue in a radio link protocol (RLP) layer at a first time $t_n$ based on a video frame rate;
   determine a second size $V_m$ of the video queue at a second time $t_m$ based on an audio frame rate;
   if the first size $V_n$ or the second size $V_m$ is greater than zero, then use the first size $V_n$, a previous size $V_{n-1}$ of the video queue associated with a previous video frame, a previous video frame size $B_{n-1}$, the first time tn, and a time $t_{n-1}$ associated with the previous size of the video queue to determine an estimated video throughput VTP of a transmission channel;
   if the first size $V_n$ and the second size $V_m$ are equal to zero, then searching for an earlier time based on the audio frame rate when the video queue size was greater than zero;
   after finding the earlier time based on the audio frame rate when the video queue size was greater than zero, use an earlier queue size $V_{m-i}$ based on the audio frame rate, the previous size $V_{n-1}$ of the video queue associated with the previous video frame, the previous video frame size $B_{n-1}$, the earlier time $t_{m-1}$, and the time $t_{n-1}$ associated with the previous size of the video queue to determine the estimated video throughput VTP of the transmission channel;
   use the estimated video throughput VTP to determine a channel-constrained video frame size; and
   use the channel-constrained video frame size to control a video encoding rate.

18. The apparatus of claim 17, wherein instructions operate on an application layer above the RLP layer.

19. The apparatus of claim 17, wherein a medium access control (MAC) layer for video flows of the apparatus does not react to sector loading.

20. The apparatus of claim 17, wherein the instructions that, when executed by the processor, cause the apparatus to use the first size ($V_x$), a previous size ($V_{n-1}$) of the video queue associated with a previous video frame, a previous video frame size ($B_{n-1}$), the first time ($t_x$), and a time ($t_{n-1}$) associated with the previous size of the video queue to determine the estimated video throughput (VTP) comprise:

$$VTP = \frac{B_{n-1}V_{n-1} - V_x}{t_x - t_{n-1}}.$$

21. The apparatus of claim 17, wherein the instructions that, when executed by the processor, cause the apparatus to use the earlier size ($V_x$), the previous size ($V_{n-1}$) of the video queue associated with the previous video frame, the previous video frame size ($B_{n-1}$), the earlier time ($t_x$), and the time ($t_{n-1}$) associated with the previous size of the video queue to determine the estimated video throughput (VTP) comprise:

$$VTP = \frac{B_{n-1} + V_{n-1} - V_x}{t_x - t_{n-1}}.$$

22. The apparatus of claim 17, wherein the instructions further comprise if the first size and the second size are equal to zero, and a third size of the video queue associated with a previous audio frame is greater than zero, then using the third size, the previous size of the video queue associated with a previous video frame, the previous video frame size, a time associated with the third size, and the time associated with the previous size of the video queue to determine the estimated video throughput.

23. The apparatus of claim 17, wherein the video queue is assigned to only store video packets.

24. The apparatus of claim 17, wherein the instructions that, when executed by the processor, cause the apparatus to use the estimated video throughput to determine a channel-constrained video frame size further comprise instructions that, when executed by the processor, cause the apparatus to use the video frame rate, the first size and an adjustment factor, which controls how much the video encoding rate reacts to channel conditions, wherein a video frame size is determined based on the video frame rate and the estimated video throughput is increased by the adjustment factor.

25. The apparatus of claim 24, wherein the adjustment factor has a first value for video conferencing and a second value for video sharing.

26. The apparatus of claim 17, further comprising:
   a video encoder configured to use the video encoding rate to encode video; and
   a transmitter configured to transmit the encoded video across a wireless channel using Code Division Multiple Access Evolution Data Optimized Revision A (CDMA EV-DO Rev A) protocols.

27. The apparatus of claim 17, further comprising instructions that, when executed by the processor, cause the apparatus to:
   determine whether the channel-constrained video frame size is greater than a minimum frame size threshold;

if the channel-constrained video frame size is greater than the minimum frame size threshold, determine whether the channel-constrained video frame size is smaller than a frame size constrained by a virtual buffer;

if the channel-constrained video frame size is smaller than the frame size constrained by the virtual buffer, then use the channel-constrained video frame size to control the video encoding rate; and if the channel-constrained video frame size is greater than the frame size constrained by the virtual buffer, then use the frame size constrained by the virtual buffer to control the video encoding rate.

28. An apparatus that encodes video data, the apparatus comprising a processor and a machine-readable memory storing a set of instructions that, when executed by the processor, cause the apparatus to:

determine a size of a video queue in a radio link protocol (RLP) layer;

determine a transmit power headroom limitation from a medium access control (MAC) layer;

use the determined transmit power headroom limitation to determine a MAC payload size;

use the determined MAC payload size and an estimate of how many transmission opportunities are given to video in a time period to determine an estimated video throughput;

use the estimated video throughput and the determined size of the video queue in the RLP layer to determine a channel-constrained video frame size; and use the channel-constrained video frame size to control a video encoding rate.

29. The apparatus of claim 28, wherein the instructions that, when executed by the processor, cause the apparatus to use the estimated video throughput and the determined size of the video queue in the RLP layer to determine a channel-constrained video frame size further comprise instructions that, when executed by the processor, use an adjustment factor, which controls how much the video encoding rate reacts to channel conditions.

30. The apparatus of claim 28, further comprising instructions that when executed by the processor, cause the apparatus to:

determine whether the channel-constrained video frame size is greater than a minimum frame size threshold;

if the channel-constrained video frame size is greater than the minimum frame size threshold, determine whether the channel-constrained video frame size is smaller than a frame size constrained by a virtual buffer;

if the channel-constrained video frame size is smaller than the frame size constrained by the virtual buffer, then use the channel-constrained video frame size to control the video encoding rate; and if the channel-constrained video frame size is greater than the frame size constrained by the virtual buffer, then use the frame size constrained by the virtual buffer to control the video encoding rate.

31. An apparatus that encodes video data, the apparatus comprising:

a radio link protocol (RLP) layer queue configured to store video data;

a first unit configured to receive a size of the RLP video queue and a transmit power headroom limitation from a medium access control (MAC) layer, use the transmit power headroom limitation to determine a MAC payload size, use the determined MAC payload size and an estimate of how many transmission opportunities are given to video in a time period to determine video throughput, and use the determined video throughput and the size of the video queue in the RLP layer to determine a channel-constrained video frame size;

a second unit to use the channel-constrained video frame size to control a video encoding rate; and a video encoder to use the video encoding rate to encode video.

32. The apparatus of claim 31, further comprising:

a virtual buffer; and a third unit configured to:

determine whether the channel-constrained video frame size is greater than a minimum frame size threshold;

if the channel-constrained video frame size is greater than the minimum frame size threshold, determine whether the channel-constrained video frame size is smaller than a frame size constrained by a virtual buffer;

if the channel-constrained video frame size is smaller than the frame size constrained by the virtual buffer, then use the channel-constrained video frame size to control the video encoding rate; and if the channel-constrained video frame size is greater than the frame size constrained by the virtual buffer, then use the frame size constrained by the virtual buffer to control the video encoding rate.

33. An apparatus that encodes video data, the apparatus comprising:

means to determine a size of a video queue in a radio link protocol (RLP) layer;

means to determine a transmit power headroom limitation from a medium access control (MAC) layer;

means to use the determined transmit power headroom limitation to determine a MAC payload size;

means to use the determined MAC payload size and an estimate of how many transmission opportunities are given to video in a time period to determine an estimated video throughput;

means to use the estimated video throughput and the determined size of the video queue in the RLP layer to determine a channel-constrained video frame size; and means to use the channel-constrained video frame size to control a video encoding rate.

\* \* \* \* \*